Feb. 15, 1938. H. T. RICHARDSON 2,108,611
FASTENER FOR ATTACHING CORRUGATED COVERING SHEETS
Filed Jan. 23, 1937
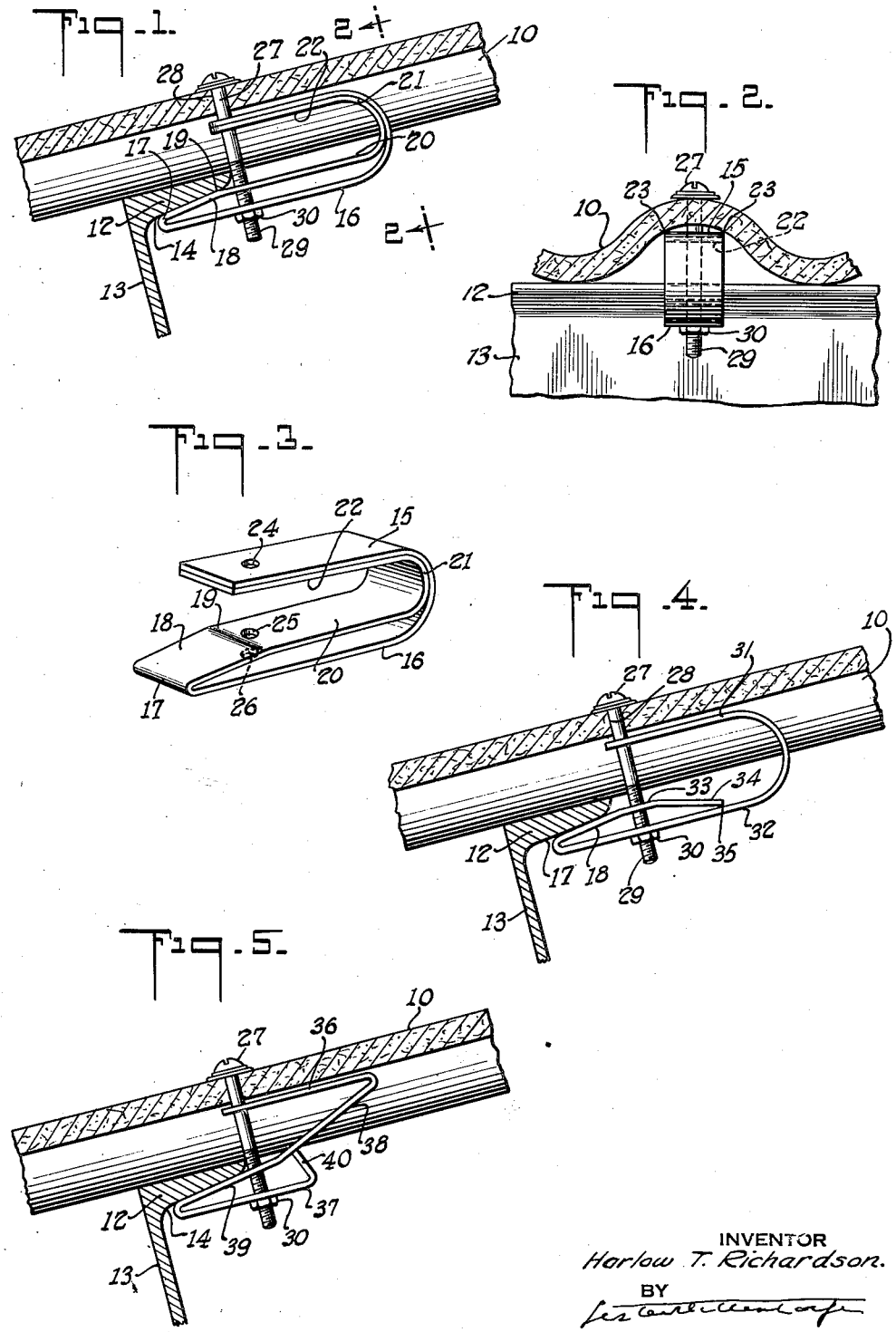
INVENTOR
Harlow T. Richardson.
BY
ATTORNEY Patented Feb. 15, 1938

2,108,611

UNITED STATES PATENT OFFICE 2,108,611

FASTENER FOR ATTACHING CORRUGATED COVERING SHEETS

Harlow T. Richardson, North Plainfield, N. J., assignor to The Ruberoid Co., New York, N. Y., a corporation of New Jersey Application January 23, 1937, Serial No. 122,027

8 Claims. (Cl. 108—33)

The present invention relates to fasteners for attaching corrugated covering sheets to supports therefor in such manner that the sheets are cushioned on the supports against injurious wind shocks, and cannot be injured by any expansion or contraction of the support arising from temperature changes. The fastener may be used for attaching the sheets to roofs, walls and other building surfaces.

Spring clips, folded to bear on the one hand against the under face of the covering sheet and on the other hand against the under faces of the cross pieces or purlins on the roof or wall, have commonly been employed to effect a cushioned attachment of the sheet to the roof or wall. Bolts or screws passing through the covering sheets and through opposed legs of the clips have been used to hold and tighten the clips in place.

Commonly, however, the clips have been of a style requiring careful tensioning by the bolts, at the risk of dislocation of the clips or of injury to the covering; and have been such that even when properly set originally, they have been unable to resist wind shocks and other strains tending to pull or rock them free of the cross pieces intended to hold the same. If the bolts were in all instances located close to the edge of the cross piece or purlin there would be little or no arm wherewith to pull or rock the clips free of the same. In practice, however, the bolt holes will fall at different distances from the edge of the supporting member, thus providing arms which act as levers to dislocate clips of styles heretofore in use.

An object of the present invention is a clip of such style that over-tightening of the bolt cannot dislocate the clip. This is because the bolt nut or head has no direct bearing upon that part of the clip which engages the cross piece or purlin, and can exert no pressure tending to pull or rock the clip free of its supporting member. In the present clip, the bolt nut or head bears upon an element of the clip which is spring connected to that part of the clip which directly engages the support; and the spring connection is such that over-tightening of the nut only increases the spring pressure and effective grip of the clip on its seat on the support. It therefore becomes immaterial whether or not the bolt is immediately adjacent the edge of the support or is removed therefrom at varying distances. This spring pressure also has the function of preventing loosening of the clip by vibration.

In this connection it is a feature of the invention that the clip is so shaped as to have two thicknesses thereof, with correspondingly increased strength, under the support; this being important because it is here that clips have ordinarily failed as the result of bending down and sliding free of the support. There is play, however, between the thickness which is the clip seating element, and the thickness which serves as the spring connection thereto from the nut seat.

A feature of the invention is a clip of such form that overtightening of the bolts, such as might cause injury to the covering, bends the clip leg which is engaged by the bolt nut; thus visibly registering the poor workmanship of the laborer, and sparing the inspector or application foreman the trouble of testing each clip with a screw driver.

Other objects and features of the invention will more fully appear in connection with the accompanying drawing in which:

Figure 1 is a view in longitudinal cross-section showing a fragment of covering sheet and of support, and showing the clip device for attaching the two;

Fig. 2 is a view in cross-section on the line 2—2 of Fig. 1;

Fig. 3 is a view in perspective of one form of the clip;

Fig. 4 is a view, similar to Fig. 1, showing, however, a modified form of clip; and Fig. 5 is a view similar to Figs. 1 and 4, in which a further modified form of the clip is shown.

Referring to Fig. 1, a fragment of corrugated sheet covering 10 is shown as supported upon the upper flange 12 of an angle or channel bar 13. It will be noted that the under face 14 of the bar flange 12 is inclined in a manner common in the art.

In Fig. 1, the clip employed is of the form shown in detail in Fig. 3. This clip is a single spring piece so bent as to form an outer U and an inner U. The upper leg 15 and the lower leg 16 of the outer U are substantially parallel. At 17 the lower leg 16 of the outer U is folded back at an incline 18 which extends to a point 19, whence the spring is continued as the lower leg 20 of the inner U to the fold 21 at the end of the clip, where it engages the inner face of the outer U, and thence is continued around as leg 22 of the inner U, in contact with the inner face of the upper leg 15 of the outer U.

As shown in Fig. 2, the upper leg of the outer U, as stiffened by the upper leg 22 of the inner U, bears against the inner or under face of the covering sheet 10 along the edges 23, and supports the same. As shown in Fig. 1, the inclined face 18 of the clip is matched to the inclined face 14 of the bar flange and lies against the latter to brace the clip on the support.

As shown in Fig. 3, aligned holes 24, 25 and 26 in the clip provide passage for a screw or bolt 27 which is passed through a hole 28 in the covering sheet in alignment with the holes 24, 25 and 26 in the clip. In the present instance, the screw is passed through from the outside of the covering sheet, and its inner threaded portion 29 carries a nut 30. This nut is turned up into contact with the outer lower leg of the clip, and when the nut is in the position shown in Fig. 1 with the clip surface 18 against the flange 12, the parts are in home position. Should the nut 30 be turned too far, no injury to the device can occur because only an indentation or bending of the lower clip leg 16 can result. This indentation or bending will be visible to one inspecting the work and will serve as a check upon the workmanship of the laborers setting the covering, thus obviating the necessity of testing each lip with a screw driver.

As shown in Fig. 1, the bolt or screw 27 is substantially in contact with the end of the bar flange 12. In practice, however, such contact may not exist by one-half inch or so (see Fig. 4). Nevertheless, any such remoteness of the bolt or screw 27 from the flange 12 cannot result in any dislocation of the clip around the end of the flange which would weaken or render ineffective the function of the clip. This is because the nut 30 does not bear upon that leg of the clip which contacts with the bar flange, but, on the contrary, as above pointed out, contacts with the lower leg of the outer U. Thus, undue pressure of the nut 30 on the clip, instead of tending to pull the clip around the end of the bar flange, only causes an increased spring pressure the more tightly to hold the clip portion 18 to the flange face 14. The spring pressure of part 16 also serves to prevent looseness which might come from vibration.

The modified form of clip shown in Fig. 4 differs from that shown in Fig. 1 in that there is no complete inner U to the clip. The clip has a single upper leg 31 which contacts as in Fig. 2 with the inner or under face of the covering sheet. The lower leg 32 of the clip is folded, as in the clip of Fig. 1, to provide the inclined surface 18 for contact with the inclined surface 14 of the supporting bar, and the portion 18 is continued, first as a portion 33 parallel to the leg 32, and thence at a downward incline to the distal end 35 thereof, which bears upon the leg 32. The parts 31, 33 and 32 have holes, such as the holes 24, 25 and 26 of Fig. 3, in alignment with the hole 28 in the covering sheet, and the screw or bolt 27 is passed through these aligned holes to be held in place by a nut 30 bearing against the leg 32 of the clip, in the same manner as in Fig. 1.

As in Fig. 1, undue tightness of the nut 30 against the leg 32 can injure nothing, but can only cause the portion 18 of the clip the more tightly to bear upon and be held by the bar flange 12. In Fig. 4 it will be noted that the bolt 27 is shown as somewhat removed from the end of the bar flange 12. This, as above pointed out, in nowise weakens the attachment, because the nut 30 does not bear upon and cannot bend or rock the clip part 33. By reason of the end 34 of the clip being turned down into contact with the lower clip leg 32, a stiff spring action is created between the leg 32 and the clip part 18.

In the modified form of clip shown in Fig. 5, the clip is of general Z-shape instead of U-shape. It has an upper leg 36 functioning in all respects like the upper leg 31 of the Fig. 4 modification, and has a lower leg 37. These two legs are connected by a cross piece 38 which at first is somewhat steeply inclined toward the lower leg but which about midway assumes the incline of the under face 14 of the supporting bar, and thus provides a part 39, functioning as the parts 18 of the clips of Figs. 3 and 4, to provide a seat for the clip on the bar. At its distal end the lower leg 37 of the clip is turned up at 40 and caused to bear against the cross part 38 of the clip, to strengthen the spring effect thereof. A screw or bolt 27 is passed through aligned holes in the covering sheet, clip leg 36, cross part 38, and lower leg 37. As in the other forms of the device, the nut 30 bears upon the lower leg, thus eliminating any tendency of the device to be pulled or rocked out of place around the end of the bar flange. Here again, undue pressure on the nut only tends to tighten the clip to the bar flange.

It will be noted that in each of the Figs. 1, 4 and 5 forms of the invention there is a double thickness of clip material under the support, where the clips have heretofore failed because of weakness.

The spring clips are used, not only at spaced intervals throughout the length of the sheets, but also at the joints where the sheets overlap each other. In the latter use, the bolt or screw 27 passes through both sheets.

In Fig. 3 the clip is shown in its condition before it is bolted in place in the assembly. It will be noted that the two legs of the clip initially diverge slightly from parallel but that when used to fasten the corrugated sheet to the purlin, they are drawn substantially parallel by the bolt and nut as seen in Fig. 1. The initial divergence of the legs gives the clip structure additional resilience. It will be understood, of course, that in the forms of clips shown in Figs. 4 and 5, the upper and lower legs may initially be slightly divergent instead of being parallel as shown in their bolted condition.

What I claim is:

1. A spring clip for securing corrugated covering sheets to underlying supports, the clip being folded to have opposed and spaced legs, one leg for contact with the under face of the covering and the other leg for contact with the under face of the support, the support contacting leg being itself folded into two opposed and spaced reaches, the upper of which serves as the bearing for the clip on the support and the lower of which is yieldable with respect thereto, and a screw or bolt for passage through the covering, upper clip leg and both reaches of the lower clip leg.

2. A spring clip for securing corrugated covering sheets to underlying supports, a clip being folded to have opposed and spaced legs, one leg for contact with the under face of the covering and the other leg for contact with the under face of the support, the support contacting leg being itself folded into two opposed reaches which are spaced except that the distal end of the upper of said reaches is turned down to contact with the lower of said reaches, the upper of said reaches serving as the bearing for the clip on the support and the lower of said reaches being yieldable with respect thereto.

3. A spring clip for securing corrugated covering sheets to underlying supports, the clip being folded to have opposed and spaced legs, one leg for contact with the under face of the covering and the other leg for contact with the underface of the support, the support contacting leg being itself folded into two opposed reaches which are spaced except that the distal end of the lower of said reaches is turned into contact with the upper of said reaches, the upper of said reaches serving as the bearing for the clip on the support, and the lower of said reaches being yieldable with respect thereto.

4. A spring clip for securing corrugated covering sheets to underlying supports, the clip being folded into two portions comprising an outer U and an inner U, the upper leg of the double U structure being for contact with the under face of the covering and the lower leg of such U structure being for contact with the underface of the support, the two portions of the lower leg of the clip being spaced one from the other, the upper of said portions being for contact with the support and the lower of said portions being yieldable with respect thereto.

5. A spring clip for securing corrugated covering sheets to underlying supports, the clip being folded into two portions comprising an outer U and an inner U, the upper leg of the double U structure being for contact with the under face of the covering and the lower leg of such U structure being for contact with the underface of the support, the two portions of the lower leg of the clip being spaced one from the other, the upper of said portions being for contact with the support and the lower of said portions being yieldable with respect thereto, and a screw or bolt for passage through the covering and for passage through both legs of the double U structure.

6. A structural assembly, comprising supports for corrugated covering sheets, covering sheets on said supports, and spring clips for securing the covering sheets to the supports, each clip being folded to have opposed and spaced legs, one leg for contact with the under face of the covering and the other leg for contact with the under face of the support, the support contacting leg being itself folded into two opposed and spaced reaches, the upper of which serves as the bearing for the clip on the support and the lower of which is yieldable with respect thereto.

7. A structural assembly, comprising supports for corrugated covering sheets, covering sheets on said supports, and spring clips for securing the covering sheets to the supports, each clip being folded to have opposed and spaced legs, one leg for contact with the under face of the covering and the other leg for contact with the under face of the support, the support contacting leg being itself folded into two opposed and spaced reaches, the upper of which serves as the bearing for the clip on the support and the lower of which is yieldable with respect thereto, and a screw or bolt for passage through the covering, upper clip leg and both reaches of the lower clip leg.

8. A structural assembly, comprising supports for corrugated covering sheets, covering sheets on said supports, and spring clips for securing the covering sheets to the supports, each clip being folded into two portions comprising an outer U and an inner U, the upper leg of the double U structure being for contact with the under face of the covering and the lower leg of such U structure being for contact with the under face of the support, the two portions of the lower leg of the clip being spaced one from the other, the upper of said portions being for contact with the support and the lower of said portions being yieldable with respect thereto.

HARLOW T. RICHARDSON.